3,407,047
PREPARATION OF PHOSPHONITRILIC CHLORIDE POLYMERS

Norman Lovelace Paddock, Altrincham, and Harold Trevor Searle, Sutton Coldfield, England, assignors, by mesne assignments, to Hooker Chemical Corporation, New York, N.Y., a corporation of New York
No Drawing. Continuation-in-part of application Ser. No. 807,748, Apr. 21, 1959. This application Sept. 25, 1963, Ser. No. 311,319
Claims priority, application Great Britain, Apr. 25, 1958, 13,223/58
6 Claims. (Cl. 23—357)

ABSTRACT OF THE DISCLOSURE

The time for the reaction, in solution, of phosphorus pentachloride with ammonium chloride to form phosphonitrilic chloride polymers is materially reduced by incorporating in the reaction medium a small amount of a metallic salt which is capable of forming a co-ordination complex with ammonia or an amine.

---

This application is a continuation-in-part of application Ser. No. 807,748 filed on Apr. 21, 1959, now abandoned.

This invention is for improvements in or relating to a process for the production of phosphonitrilic chloride polymers, such process being more rapid than those known hitherto.

The reaction of phosphorus pentachloride with ammonium chloride in refluxing tetrachloroethane solvent, carried out as described by Schenk and Romer in Berichte 57B 1343 (1924), has the great disadvantage that it takes several hours to reach completion. Normally, the time required to ensure complete reaction, according to this prior method, would be between 7 and 8 hours. Of course, other solvents may be used instead of tetrachloroethane in this type of reaction and when, for instance, monochlorobenzene is used as solvent in a Schenk and Romer type reaction, the time required for complete reaction is of the order of 25 to 30 hours.

We have now found that the addition of a small amount of a metallic salt, which can form a co-ordination complex with ammonia or an amine, to the reactant mixture reduces the time of reaction very considerably. Thus, in the Schenk and Romer reaction with tetrachloroethane as solvent, the use of such a metallic salt reduces the reaction time to around 4 or 5 hours, and in some cases to as low as 1.5 to 2 hours, depending on the metallic salt employed; and when using monochlorobenzene as solvent, the reaction time is reduced to between 5 and 10 hours.

In this catalytic reaction the metallic salts must, of course, be used in their anhydrous form, since water would react with the phosphorus pentachloride thereby reducing the yield of phosphonitrilic chloride.

This reaction may be carried out in any solvent selected from the group consisting of monochlorobenzene, o-dichlorobenzene, nitrobenzene, tetrachloroethane, pentachloroethane, hexachloro 1,3-butadiene and phosphorus oxychloride. Monochlorobenzene may be conveniently used as solvent in the Schenk and Romer reaction and this is highly desirable since this solvent has a lower boiling point than tetrachloroethane and therefore may be more readily removed from the product at the end of the reaction. Further advantages of this solvent over tetrachloroethane are that it is cheaper and less toxic. Thus the use of the metallic salts as catalysts in the Schenk and Römer reaction allows some latitude in the choice of solvent for the reaction. The advantages of this invention are not confined to the normal method of making the polymeric phosphonitrilic chlorides, i.e. the method of Schenk and Römer. The metallic salts are equally effective in reducing the reaction time of the improved method of preparation of these polymers described in copending application Ser. No. 807,749, filed Apr. 21, 1959, now abandoned. now refiled as a continuation-in-part, as application Ser. No. 185,389 on Apr. 5, 1962. So that, by using a metallic salt together with the slow addition of the phosphorus pentachloride therein described, we obtain greater yields of the phosphonitrilic chloride polymers in about half the time.

In general, we have found that a molar concentration of up to 10% of the metallic salt in respect to moles of phosphorus pentachloride is a suitable amount of catalyst to use. In a typical case when a 1% molar concentration is used, the reaction time is halved, so that the reaction is complete in 4–4.5 hours. Furthermore, when a molar concentration of 10% is used, the reaction is substantially completed in 2–2.5 hours.

The extent of the reduction in the reaction time depends also on the particular metallic salt employed. Using a 5% molar concentration of anhydrous aluminium chloride in respect to moles of phosphorus pentachloride, the reaction time is reduced to 5–5.5 hours, whereas, if the same concentration of anhydrous manganous chloride is used, the reaction is substantially completed after 3–3.5 hours.

The reaction of the invention is carried out at an elevated temperature, preferably at a temperature between about 100° C. and the boiling point of the solvent under the conditions of the reaction. If the source of heat is at a temperature substantially above 140° C., and the solvent boils above this temperature, the temperature of the reaction mixture tends not to rise above a temperature of about 135° C.–145° C., the reaction being endothermic. It is therefore not necessary to carry out the reaction under reflux in these circumstances. If, on the other hand, a solvent boiling below about 140° C. is used, the reaction still proceeds at a good speed, but in this case it is carried out under reflux. Again, it is possible if desired to operate under reflux with a high boiling solvent if a pressure below atmospheric is used. It may in any event be desirable to carry out the process with distillation of the solvent, for example, when operating as described in application Ser. No. 185,389, filed Apr. 5, 1962, according to which phosphorus pentachloride is introduced gradually in the recycled solvent. In this case, owing to the gradual addition of the phosphorus pentachloride to the reaction mixture, the temperature is not held down to 140° C. but will rise to the boiling point of the solvent, so that any of the solvents disclosed can be used at atmospheric pressure regardless of their boiling points.

Metallic salts for use in the present invention are: anhydrous cobaltous chloride, anhydrous aluminium chloride, anhydrous manganous chloride, anhydrous cupric chloride, anhydrous stannic chloride, anhydrous magnesium chloride, anhydrous zinc chloride, anhydrous titanium tetrachloride, anhydrous cadmium chloride and anhydrous chromic chloride.

The following examples serve to illustrate the invention.

In the following examples (1–9) 625.5 g. (3.0 moles) of phosphorus pentachloride was heated with 176.5 g. (3.3 moles) of ammonium chloride and small amount of metal chloride in 1.0 litre of symmetrical tetrachloroethane solvent at reflux temperature until the evolution of hydrogen chloride from the reaction had subsided.

EXAMPLE 1

Using 39.0 g. of anhydrous cobaltous chloride (0.3 mole, 10% molar concentration) as catalyst the reaction was completed in 2 to 2.5 hours.

EXAMPLE 2

The use of 4.0 g. of anhydrous cobaltous chloride (0.03 mole, 1% molar concentration) as catalyst enabled the reaction to be completed in 4 to 4.5 hours.

EXAMPLE 3

Using 20.0 g. of anhydrous aluminium chloride (0.15 mole, 5% molar concentration) as catalyst the reaction was completed after 5 to 5.5 hours.

EXAMPLE 4

The use of 18.8 g. of anhydrous manganous chloride (0.15 mole, 5% molar concentration) reduced the reaction time to from 3 to 3.5 hours.

EXAMPLE 5

When 20.1 g. of anhydrous cupric chloride (0.15 mole, 5% molar concentration) was used as catalyst, the reaction was complete after 3.5 to 4 hours.

EXAMPLE 6

39.1 g. of stannic chloride (0.15 mole, 5% molar concentration) as catalyst reduced the reaction time to from 3 to 3.5 hours.

EXAMPLE 7

When 14.3 g. of anhydrous magnesium chloride (0.15 mole, 5% molar concentration) aws used as catalyst, the reaction time was approximately 2.25 hours.

EXAMPLE 8

When the catalyst was 20.5 g. of anhydrous zinc chloride (0.15 mole, 5% molar concentration), the reaction time was only 1.5 to 2 hours.

EXAMPLE 9

With 28.5 g. of anhydrous titanium tetrachloride (0.15 mole, 5% molar concentration) as catalyst the reaction was completed in 4.5 to 5 hours including an apparent initial induction period of approximately 1 hour.

In the following examples the effect of a catalyst on the reaction in monochlorobenzene as a solvent is made apparent.

EXAMPLE 10

(a) 144 lb. of phosphorus pentachloride and 40.5 lb. of ammonium chloride were heated together in 304 lb. of refluxing monochlorobenzene for 32 hours, the yield of phosphonitrilic chlorides being 74 lb.

(b) In another experiment 159.5 lb. of phosphorus pentachloride, 45.2 lb. of ammonium chloride, and 0.85 lb. of anhydrous zinc chloride were heated together in 338 lb. of refluxing monochlorobenzene for 10.5 hours. The yield of phosphonitrilic chlorides was 84 lb.

EXAMPLE 11

(a) 208.3 g. of phosphorus pentachloride and 58.9 g. of ammonium chloride were heated together in 400 ml. of refluxing monochlorobenzene for 25 hours. The yield of phosphonitrilic chlorides was 114 g.

(b) In another experiment 208 g. of phosphorus pentachloride, 59.0 g. of ammonium chloride and 1.36 g. of anhydrous zinc chloride were heated together in 400 ml. of refluxing monochlorobenzene for 5.25 hours. The yield of phosphonitrilic chlorides obtained was 116 g.

EXAMPLE 12

417 g. of phosphorus pentachloride (2.0 moles) were heated under reflux with 117.7 g. of ammonium chloride (2.2 moles) in 1.0 litre of monochlorobenzene in the presence of 3.7 g. of anhydrous cadmium chloride (.02 mole). The reaction was substantially completed after 6–6.5 hours and gave a 228 g. yield of phosphonitrilic chlorides.

EXAMPLE 13

417 g. of phosphorus pentachloride (2.0 moles) were heated under reflux with 117.7 g. of ammonium chloride (2.2 moles) in 1.0 litre of monochlorobenzene in the presence of 2.17 g. of anhydrous chromium chloride (.014 mole of $CrCl_3$). The reaction was substantially completed after 10–10.5 hours, and gave a 207 g. yield of phosphonitrilic chlorides.

EXAMPLES 14–19

417 g. of phosphorus pentachloride (2.0 moles) were heated with 117.7 g. (2.2 moles) of ammonium chloride in 1.0 litre of a solvent in the presence of 1 mole percent of a catalyst, as shown in the table below. The heating was carried out on a bath at a temperature of about 160° C. except where $POCl_3$ was the solvent. The other solvents boil at temperatures above 160° C., but $POCl_3$ boils at 107° C. and the reaction in this case was carried out under reflux. With the higher boiling solvents the reaction took place at about 140° C.

Details of these examples are shown in the following table.

| Example | Solvent | Catalyst | Weight of catalyst (g.) | Yield of phosphonitrilic chlorides (g.) | Time of reaction (hours approx.) |
| --- | --- | --- | --- | --- | --- |
| 14 | o-Dichlorobenzene | Anhydrous cobaltous chloride. | 2.6 | 220 | 2.5–3 |
| 15 | Nitrobenzene | do | 2.6 | 212 | 2.25–2.75 |
| 16 | Pentachloroethane | do | 2.6 | 210 | 2.25–2.75 |
| 17 | Hexachloro-1,3-butadiene. | do | 2.6 | [1] 243 | 2.25–2.75 |
| 18 | Phosphorus oxychloride. | do | 2.6 | 229 | 6 |
| 19 | do | Anhydrous zinc chloride. | 2.72 | 225 | 5 |

[1] Nominal.

In the case of Examples 15 and 17 the yield includes a quantity of phosphonitrilic chlorides which was recovered from the solvent. There would be no need to do this if the process were operated with recycling of the solvent as mentioned below.

In the case of Example 17 the yield stated is greater than theoretical as it includes some solvent.

In the processes of any of the foregoing examples, the phosphorus pentachloride may be added slowly to the hot solvent containing ammonium chloride, for example by introducing it gradually into recycled solvent, whereby the proportion of cyclic polymers is increased.

We claim:

1. A process for the production of polyphosphonitrilic acid chlorides which comprises heating phosphorus pentachloride with ammonium chloride in a solvent selected from the group consisting of tetrachloroethane and monochlorobenzene at reflux temperature and in the presence, in the reaction mixture, of an anhydrous metallic salt selected from the group consisting of cobaltous chloride, aluminum chloride, manganous chloride, cupric chloride, magnesium chloride, zinc chloride, stannic chloride, and titanium tetrachloride, in amounts of maximally 10 mole percent with respect to moles of phosphorus pentachloride.

2. A process for the production of polyphosphonitrilic chlorides which comprises heating in solution phosphorus pentachloride and ammonium chloride in the presence of an anhydrous metallic salt selected from the group consisting of cobaltous chloride, aluminum chloride, manganous chloride, cupric chloride, magnesium chloride, zinc chloride, stannic chloride, and titanium chloride, in amounts of maximally 10 mole percent with respect to moles of phosphorus pentachloride.

3. A process for the production of a phosphonitrilic acid chloride which comprises heating phosphorus pentachloride with ammonium chloride in tetrachloroethane at a temperature between 100° C. and the boiling point of tetrachloroethane under reaction conditions and in the presence, in the reaction mixture, of anhydrous cobaltous chloride in an amount of at most 10 mole precent with respect to the moles of phosphorus pentachloride.

4. A process for the production of a phosphonitrilic acid chloride which comprises heating phosphorus pentachloride with ammonium chloride in tetrachloroethane at a temperature between 100° C. and the boiling point of tetrachloroethane under reaction conditions and in the presence, in the reaction mixture, of anhydrous cupric chloride in an amount of at most 10 mole percent with respect to the moles of phosphorus pentachloride.

5. A process for the production of a phosphonitrilic acid chloride which comprises heating phosphorus pentachloride with ammonium chloride in monochlorobenzene at a temperature between 100° C. and the boiling point of monochlorobenzene under reaction conditions and in the presence, in the reaction mixture, of anhydrous aluminum chloride in an amount of at most 10 mole percent with respect to the moles of phosphorus pentachloride.

6. A process for the production of a phosphonitrilic acid chloride which comprises heating phosphorus pentachloride with ammonium chloride in monochlorobenzene at a temperature between 100° C. and the boiling point of monochlorobenzene under reaction conditions and in the presence, in the reaction mixture, of anhydrous manganous chloride in an amount of at most 10 mole percent with respect to the moles of phosphorus pentachloride.

References Cited

UNITED STATES PATENTS

| | | | |
|---|---|---|---|
| 2,782,133 | 2/1957 | Vallette | 23—357 X |
| 3,236,870 | 2/1966 | Branan et al. | 23—357 X |
| 3,249,397 | 5/1966 | Nichols | 23—357 |

FOREIGN PATENTS 1,085,508  7/1960  Germany.

OTHER REFERENCES

Audrieth et al.: "Chemical Reviews," vol. 32, pages 111–114 (1943).

Bode et al.: "Berichte," vol. 75B, pages 215–226 (1942).

Gmelin: "Handbuch der Anorganischen Chemie," 7th edition, 1914, vol. V, part 2, p. 726.

Roscoe et al.: "Treatise on Chemistry," 1907, vol. II, page 692.

Schmulbach: "Progress in Inorganic Chemistry," vol. 4, pages 298–302, 311 (1962).

OSCAR R. VERTIZ, *Primary Examiner.*

H. S. MILLER, *Assistant Examiner.*